(12) United States Patent
Zhang et al.

(10) Patent No.: US 11,343,381 B2
(45) Date of Patent: May 24, 2022

(54) IDENTIFYING AND RESOLVING TELECOMMUNICATION NETWORK PROBLEMS USING NETWORK EXPERIENCE SCORE

(71) Applicant: T-Mobile USA, Inc., Bellevue, WA (US)

(72) Inventors: Ting Zhang, Bellevue, WA (US); Huijae Kim, Sammamish, WA (US); Juan Murillo Pacheco, Renton, WA (US); Arundhati Ghosh, Redmond, WA (US); Xiao Zhang, Sammamish, WA (US); Prem Kumar Bodiga, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 162 days.

(21) Appl. No.: 16/930,584

(22) Filed: Jul. 16, 2020

(65) Prior Publication Data
US 2022/0021770 A1 Jan. 20, 2022

(51) Int. Cl.
*H04M 15/00* (2006.01)
*H04W 4/24* (2018.01)
(Continued)

(52) U.S. Cl.
CPC ........ *H04M 15/8016* (2013.01); *G06N 20/00* (2019.01); *H04M 15/8066* (2013.01); *H04W 4/24* (2013.01); *H04W 28/24* (2013.01)

(58) Field of Classification Search
CPC ......... H04M 15/8016; H04M 15/8066; H04M 15/00; H04M 17/00; H04M 2215/2026;
(Continued)

(56) References Cited

U.S. PATENT DOCUMENTS 6,163,604 A 12/2000 Baulier et al.
8,014,496 B2 9/2011 Schultz
(Continued)

OTHER PUBLICATIONS

Nawaz, Syed Junaid, et al. "Quantum machine learning for 6G communication networks: State-of-the-art and vision for the future." IEEE access 7 (2019): 46317-46350. (Year: 2019).*

*Primary Examiner* — Sharad Rampuria
(74) *Attorney, Agent, or Firm* — Perkins Coie LLP

(57) ABSTRACT

The disclosed system identifies and resolves telecommunication network problems and/or problems with devices utilizing the network. The system segments the user devices into groups having similar characteristics, by grouping together devices more likely to leave the network, and devices less likely to leave the network. Each group of devices has a trained machine learning model, to predict the NEX score for each device. The system focuses on devices with a low NEX score. The system determines whether the problem is with the network and/or the problem is with the device. The system gathers information from network monitoring software and determine which tower caused, for example, the call to drop. The system determines technological capability of the device from the device TAC number. The system suggests solutions to the network problems by suggesting adding a sector, tuning an antenna, etc., or if the device has problems, adjusting phone settings.

21 Claims, 5 Drawing Sheets

(51) Int. Cl.
*G06N 20/00* (2019.01)
*H04W 28/24* (2009.01)

(58) Field of Classification Search
CPC .... H04M 2215/32; G06N 20/00; H04W 4/24; H04W 28/24
See application file for complete search history.

(56) References Cited

U.S. PATENT DOCUMENTS

| | | |
|---|---|---|
| 8,782,216 B2 | 7/2014 | Raghavendran et al. |
| 8,886,209 B2 | 11/2014 | Shaw et al. |
| 8,954,121 B2 | 2/2015 | Kanj et al. |
| 9,172,593 B2 | 10/2015 | Kane |
| 9,185,643 B2 | 11/2015 | Jouin |
| 9,998,983 B2 | 6/2018 | Cui et al. |
| 10,039,013 B2 | 7/2018 | Periyasamy et al. |
| 10,164,850 B2 | 12/2018 | Tapia et al. |
| 10,334,488 B2 | 6/2019 | Periyasamy et al. |
| 10,477,426 B1 | 11/2019 | Tiwari et al. |
| 10,609,570 B2 | 3/2020 | Martone et al. |
| 10,609,587 B2 | 3/2020 | Livschitz et al. |
| 2006/0029190 A1 | 2/2006 | Schultz |
| 2009/0227251 A1 | 9/2009 | Lei et al. |
| 2010/0123575 A1 | 5/2010 | Mittal et al. |
| 2011/0307256 A1 | 12/2011 | Schultz |
| 2013/0157688 A1* | 6/2013 | Kateley .............. H04W 24/08 455/456.1 |
| 2013/0217450 A1 | 8/2013 | Kanj et al. |
| 2014/0162661 A1 | 6/2014 | Shaw et al. |
| 2015/0019916 A1 | 1/2015 | Kane |
| 2016/0007217 A1 | 1/2016 | Kapnadak et al. |
| 2016/0135067 A1 | 5/2016 | Morad et al. |
| 2016/0241429 A1 | 8/2016 | Froehlich |
| 2016/0344606 A1 | 11/2016 | Baccarani |
| 2017/0078171 A1 | 3/2017 | Tapia et al. |
| 2018/0184307 A1 | 6/2018 | Periyasamy et al. |
| 2018/0184344 A1 | 6/2018 | Periyasamy et al. |
| 2019/0132757 A1 | 5/2019 | Tapia et al. |
| 2019/0199589 A1 | 6/2019 | Le et al. |

\* cited by examiner

IDENTIFYING AND RESOLVING TELECOMMUNICATION NETWORK PROBLEMS USING NETWORK EXPERIENCE SCORE

BACKGROUND

A telecommunication network, such as a cellular network or mobile network is a communication network where the last link is wireless. The network is distributed over land areas called "cells", each served by at least one fixed-location transceiver, but more normally, three cell sites or base transceiver stations, e.g., towers. These base stations provide the cell with the network coverage which can be used for transmission of voice, data, and other types of content.

When joined together, these cells provide radio coverage over a wide geographic area. This enables numerous portable transceivers (e.g., mobile phones, tablets and laptops equipped with mobile broadband modems, pagers, etc.) to communicate with each other and with fixed transceivers and telephones anywhere in the network, via base stations, even if some of the transceivers are moving through more than one cell during transmission.

The many elements in the complex telecommunication network can have various technical issues, such as technical issues with the base transceiver stations, sectors, antennas, or even the mobile devices using the telecommunication network.

DETAILED DESCRIPTION

Disclosed here is a system for identifying and resolving telecommunication network problems as well as problems with devices utilizing the telecommunication network based on a network experience score (NEX). Initially, the system segments devices on the telecommunication network into multiple groups using various device key performance indicators (KPI) such as voice usage, billing account number (BAN) count, payload usage, and tenure, e.g., how long the device has been using the telecommunication network. For each device in each group, the system calculates NEX using network KPIs such as voice dropped call count, voice dropped call rate, voice muting, voice garbling, voice soft drops, LTE low coverage, LTE data leakage, average LTE throughput, 5G data leakage, 5G throughput, 5G latency, 5G low coverage and/or minutes between RAT change. To compute the NEX score, a machine learning model, created for each group, can predict how satisfied the user is with the telecommunication network on a scale, for example, from 1 to 10.

The machine learning model takes as inputs the network KPIs such as voice dropped call count, voice dropped call rate, voice muting, voice garbling, voice soft drops, LTE low coverage, LTE data leakage, average LTE throughput, 5G data leakage, 5G throughput, 5G latency, 5G low coverage and/or minutes between RAT change. For users with lower scores such as 80% of the maximum satisfaction, e.g., 8 or less, the system performs a more detailed analysis of the telecommunication network to determine which cell towers, sectors and/or antennas were involved in producing the dropped calls, low coverage, data leakage, low throughput, etc. To identify the cell towers, sectors and/or antennas, data from cell towers, network monitoring software and/or service can be analyzed to pinpoint the problematic hardware. To address the problems, a new sector can be added, antenna settings can be tuned and/or a new cell tower can be added.

In addition, the system analyzes user mobile devices to determine whether the phone settings are correct and to determine whether the device needs to be upgraded. For example, some devices, even though they can connect to the LTE network, have LTE network connection settings disabled, causing them to connect to lower throughput networks such as 3G and 2G. Further, some devices may not be technically capable of providing the best service to the user, such as 2G devices on a 4G network. During the analysis, the system identifies shortcomings of the devices, and suggests fixes and/or upgrade devices to the users.

Figure 1:
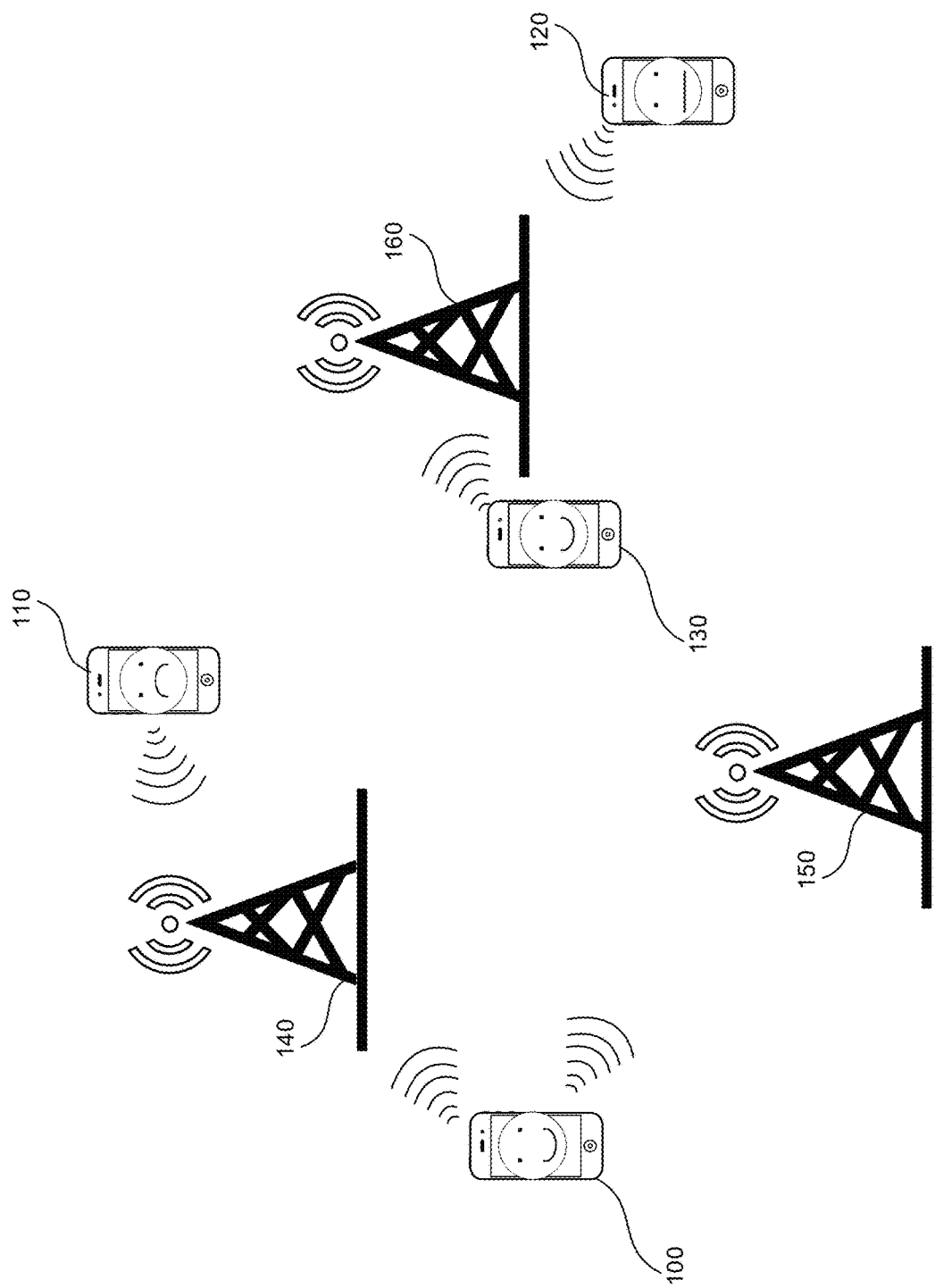
FIG. 1 shows multiple devices in communication with a wireless telecommunication network.

FIG. 1 shows a telecommunication network used by multiple mobile devices with different levels of satisfaction. The telecommunication network includes multiple elements 140, 150, 160, such as cell towers, sectors, antennas, routers, servers, etc. The multiple mobile devices 100, 110, 120, 130 can communicate with the elements 140, 150, 160 using various air interface protocols such as 2G, 3G, 4G, 5G.

The telecommunication network can provide service of varying quality to various mobile devices 100, 110, 120, 130. For example, the towers 140, 150, 160 can have various technical problems that affect the mobile devices 100, 110, 120, 130. In a more specific example, the tower 140 can drop more calls than the towers 150, 160, the throughput offered by the tower 150 can be lower than the throughput offered by towers 140, 160, and/or the coverage offered by the tower 160 can be lower than the coverage provided by the towers 140, 150.

To determine the impact that the technical problems have on the devices 100, 110, 120, 130, and which of the technical problems are more important to fix, a network experience score (NEX) score associated with each of the multiple devices 100, 110, 120, 130 can be computed. For example, both towers 160 and 140 can be involved in 50 dropped calls. However, tower 140 can drop 50 calls of one mobile device 110, while tower 160 can drop 50 calls spread across 50 mobile devices. As a result, mobile device 110 can have a low NEX score, while mobile devices 130, 120 in communication with the tower 160, can have medium and high NEX score, respectively.

Due to the low NEX score, the mobile device 110 can decide to disassociate from the telecommunication network by, for example, unsubscribing from the telecommunication network. Consequently, based on the NEX score, fixing the technical problem of the tower 140 is prioritized over fixing technical problems of tower 160, and/or tower 150.

To determine which network element, e.g. tower, sector, and/or antenna, of the telecommunication network causes the low NEX score, a hardware or software processor can trace the calls of the mobile device 110 to determine which network element is involved in the problem. For example, the processor can determine which tower, sector, and/or antenna caused a call to be dropped, was involved in low network coverage, cause data leakage, etc.

The processor can perform the tracing for multiple mobile device having a low NEX score, where the number of multiple mobile devices can exceed million, and can determine the network elements involved with multiple problems of multiple mobile devices. For each network element, the processor can track how many times the network element was involved in the multiple problems, and can rank the network elements from the network element most frequently involved with the multiple problems, to the network element least frequently involved with the multiple problems. Based on the ranked list, the processor can prioritize fixing of various network elements.

Figure 2:
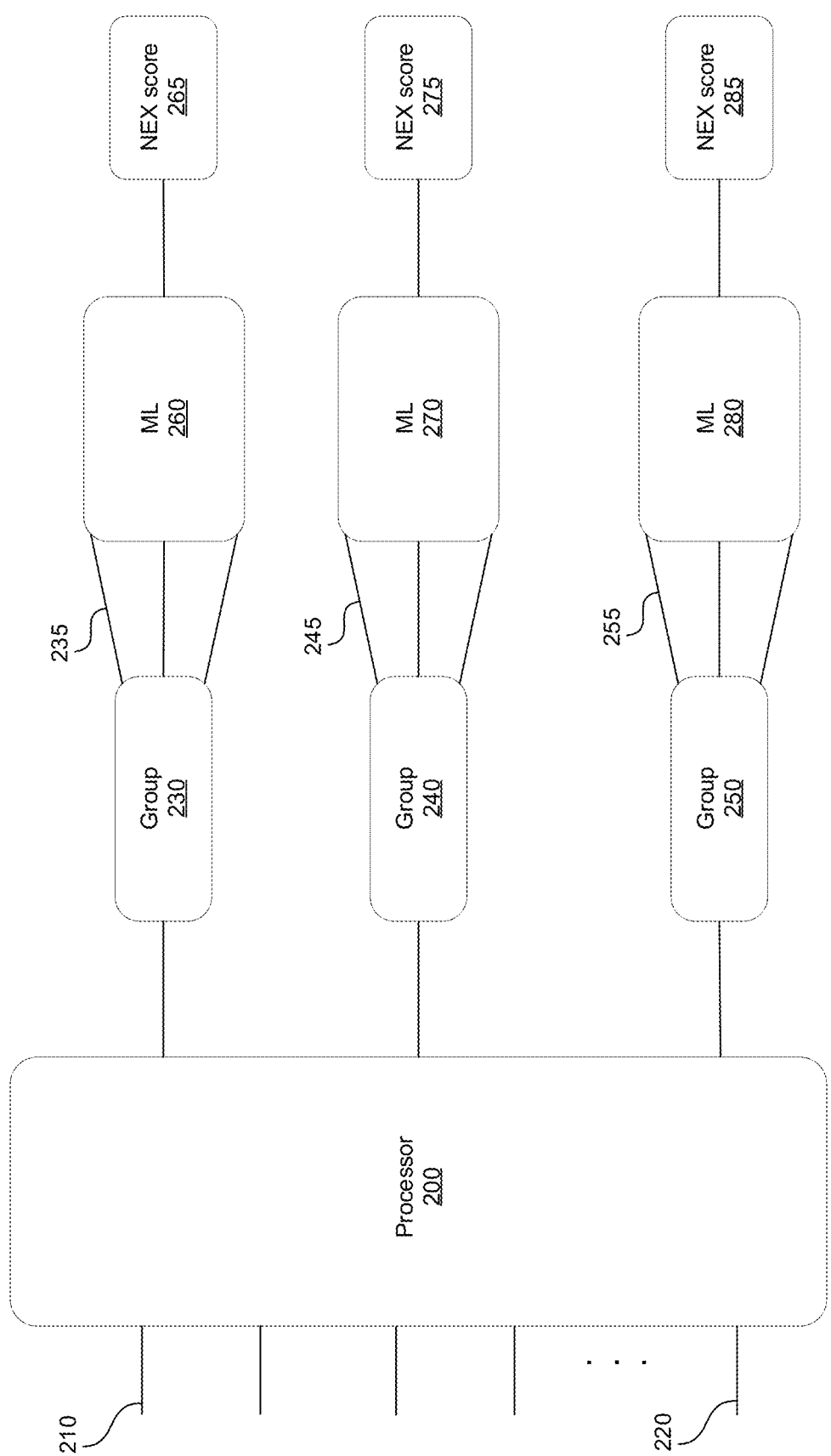
FIG. 2 shows a calculation of a NEX score.

FIG. 2 shows a calculation of a NEX score. A hardware or a software processor 200 can receive multiple inputs 210, 220 (only 2 labeled for brevity) including voice usage, billing account number (BAN) count, payload usage, tenure, and/or credit class. Based on the multiple inputs 210, 220, the processor 200 can segment the devices 100, 110, 120, 130 in FIG. 1 into multiple groups 230, 240, 250. The groups 230, 240, 250 represent different likelihoods that the devices in the particular group will disassociate from the telecommunication network. The segmentation can be done using K-means clustering, which clusters devices more likely to leave the network together, and devices less likely to leave the network together.

For example, the BAN counter measures the number of lines the device 100, 110, 120, 130 has registered with the telecommunication network. If the device 100 has only a single line registered with the telecommunication network, the device 100 probably has low problem tolerance because if the telecommunication network doesn't have good coverage, frequently drops calls, and/or doesn't have a good throughput, the device 100 is likely to leave. However, if the device 100 has a BAN count including multiple lines such as more than 4 lines, the problems of the single device 100 are weighed against the network performance for other devices on the same BAN count. If other devices do not have the same problems as device 100, then device 100 is unlikely to disassociate from the telecommunication network.

In another example, payload usage and voice usage respectively indicate how much data or voice over Internet Protocol (VoIP) each of the devices 100, 110, 120, 130 is using. Devices that have similar VoIP usage or similar data usage can be clustered into the same group 230, 240, 250.

In a third example, tenure indicates how long the device 100, 110, 120, 130 has been with the telecommunication network. If a device has been longer with the telecommunication network, the device is less likely to disassociate from the telecommunication network. Thus, devices with similar tenure can be grouped into the same group 230, 240, 250.

Once the devices 100, 110, 120, 130 have been grouped into groups 230, 240, 250, a different machine learning model 260, 270, 280 is associated with each group. Each machine learning model 260, 270, 280 is trained to predict a NEX score of a device in a particular group 230, 240, 250, respectively. Based on the NEX score, the processor determines which devices 100, 110, 120, 130 to focus on.

To predict the NEX score of the device, the machine learning model 260, 270, 280 receives multiple inputs 235, 245, 255 (only 3 labeled for brevity), e.g., the network KPIs, including a voice dropped call count, a voice dropped call rate, a low coverage value, a data leakage value, an average air interface, e.g., Long-Term Evolution (LTE) or 5G, throughput value, voice muting, voice garbling, voice soft drops, or number of minutes between radio access technology (RAT) change. Based on the multiple inputs the machine learning model 260, 270, 280 can produce a NEX score 265, 275, 285 associated with the device 100, 110, 120, 130. The multiple inputs 235, 245, 255 are collected from a network monitoring system, which can capture all the signals and when the device 100, 110, 120, 130 communicates with the telecommunication network.

For example, the voice dropped call count indicates how many dropped calls the device 100, 110, 120, 130 have had over a predetermined period, such as a week, a month, 6 months, a year etc. The higher the voice dropped call count, the more likely that the NEX score 265, 275, 285 is low.

The voice call dropped rate can include a percentage of dropped calls for the device 100, 110, 120, 130 over the predetermined period. Again, the higher the voice dropped call rate, the more likely the NEX score 265, 275, 285 is low.

Low coverage value indicates telecommunication network coverage that the device 100, 110, 120, 130 have received over the predetermined period. A high low coverage value indicates that the device 100, 110, 120, 130 did not receive good coverage. Consequently, the higher the low coverage value, the more likely that the NEX score 265, 275, 285 is low.

The data leakage value indicates how much of voice and data associated with the device 100, 110, 120, 130 over the predetermined period of time has been transferred to an unauthorized recipient. The higher the data leakage value, the more likely that the NEX score 265, 275, 285 is low.

The average air interface throughput value indicates the throughput that the device 100, 110, 120, 130 has received from the telecommunication network over the predetermined period of time. The higher the air interface throughput value, the more likely that the NEX score 265, 275, 285 is high.

The number of minutes between RAT change indicate how frequently a call associated with the device 100, 110, 120, 130 is handed off between towers. Each handoff can cause a decrease in the quality of the call. Consequently, the higher the number of minutes between RAT change, the more likely that the NEX score 265, 275, 285 is high.

Figure 3:
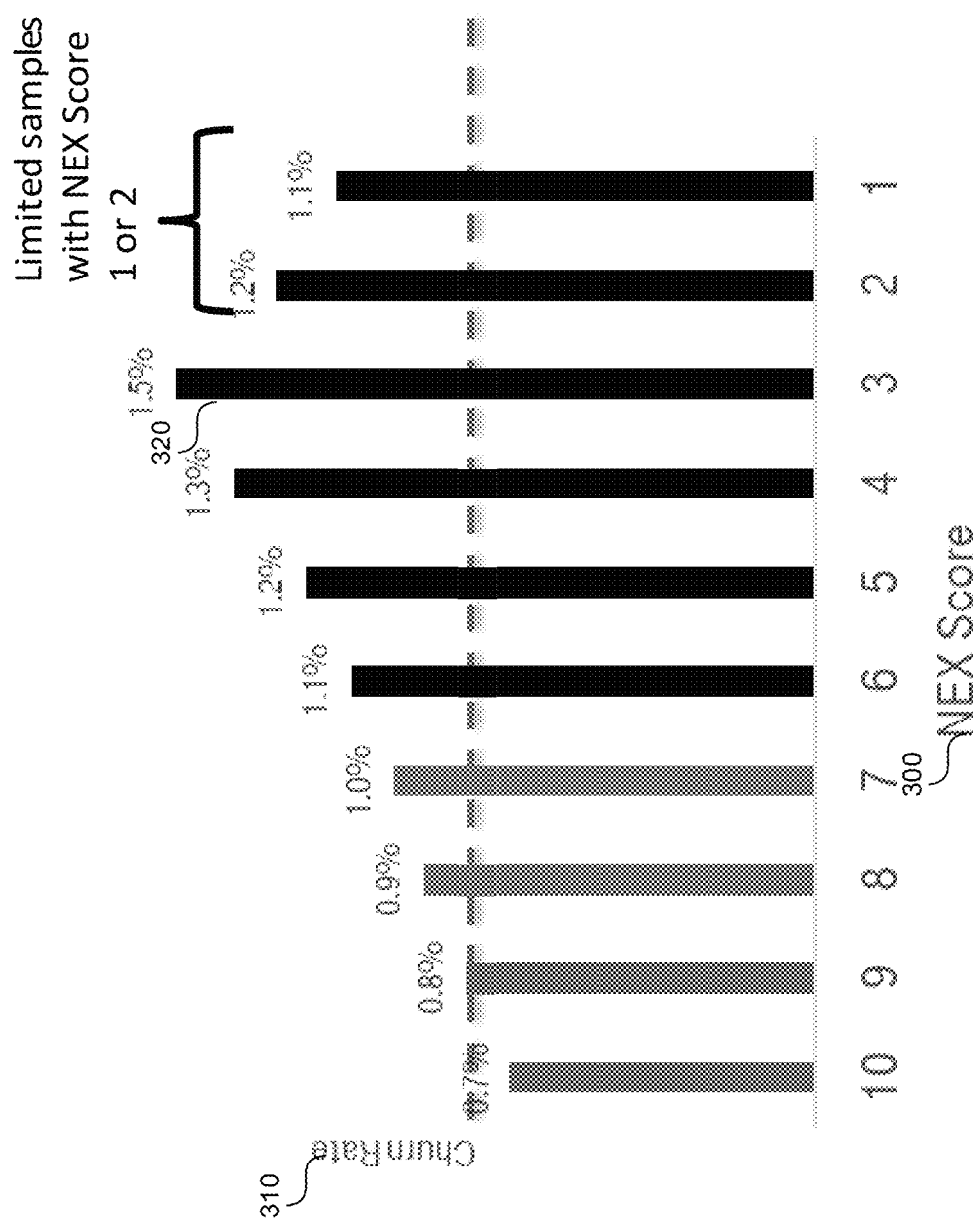
FIG. 3 shows a correlation between NEX score and churn rate.

Voice muting indicates how frequently the voice of one of the speakers is unintentionally muted. Voice garbling indicates how frequently the voice of one of the speakers is unintentionally garbled. Voice soft drops refer to events where user voluntarily terminates the call and voice quality is observed to be poor, e.g. muting and/or garbling, 5-10 seconds prior to termination. Soft drops are distinguished from hard drops, where network abnormally releases the calls. Voice soft drops indicate how frequently FIG. 3 shows a correlation between NEX score and churn rate. The NEX score 300 can be represented on a scale from 1 to 10, where 1 indicates worst telecommunication network experience, and 10 indicates best the communication network experience. The churn rate 310 indicates the likelihood that a device 100, 110, 120, 130 in FIG. 1 will disassociate from the network. As can be seen from the graph, the lower the NEX score, the higher the likelihood that the device 100, 110, 120, 130 will disassociate from the telecommunication network. The NEX scores of 1 or 2 are very rare, and thus the accuracy of their likelihood to disassociate from the network is limited.

A processor can prioritize the devices 100, 110, 120, 130 according to their NEX scores by ranking them from the lowest NEX score to the highest, or from NEX score of 3 to the NEX score of 10. Consequently, a processor can first examine the telecommunication network problems of a device in the highest prioritized group. The highest prioritized group can be group 320 having the NEX score of 3.

The processor can obtain network monitoring data from a network monitoring system to determine which telecommunication network elements such as cell towers, sectors, antennas, etc., have been involved in communication with the devices in the group 320.

For example, if the telecommunication network problems included dropped calls, the network monitoring data can include the tower that started a call, and every instance of handing over the call from tower to tower. The processor can then trace back to the telecommunication network element, e.g., the tower, where the call drop happened. Once the processor identifies the telecommunication network element that has dropped the call, the processor can determine an appropriate solution. For example, if the tower that has dropped the call has had other calls dropped by other tower sectors, the processor can determine that a new tower needs to be added. In another example, if the tower that has dropped the call has been consistently dropping calls by one sector, and not other sectors associated with the tower, the processor can determine that a new sector may need to be added to the tower. In a third example, if an antenna within a sector has consistently dropped the calls, but not other antennas in the same sector, the processor can determine that the antenna parameters need to be tuned. The processor can notify a system administrator of the problematic telecommunication network element.

In another example, if the telecommunication network problems include low coverage, the processor can obtain the location of the device 100, 110, 120, 130 having low coverage from the network monitoring data. The processor can determine which towers are providing the coverage at the device location, and can determine that additional towers need to be installed.

Figure 4:
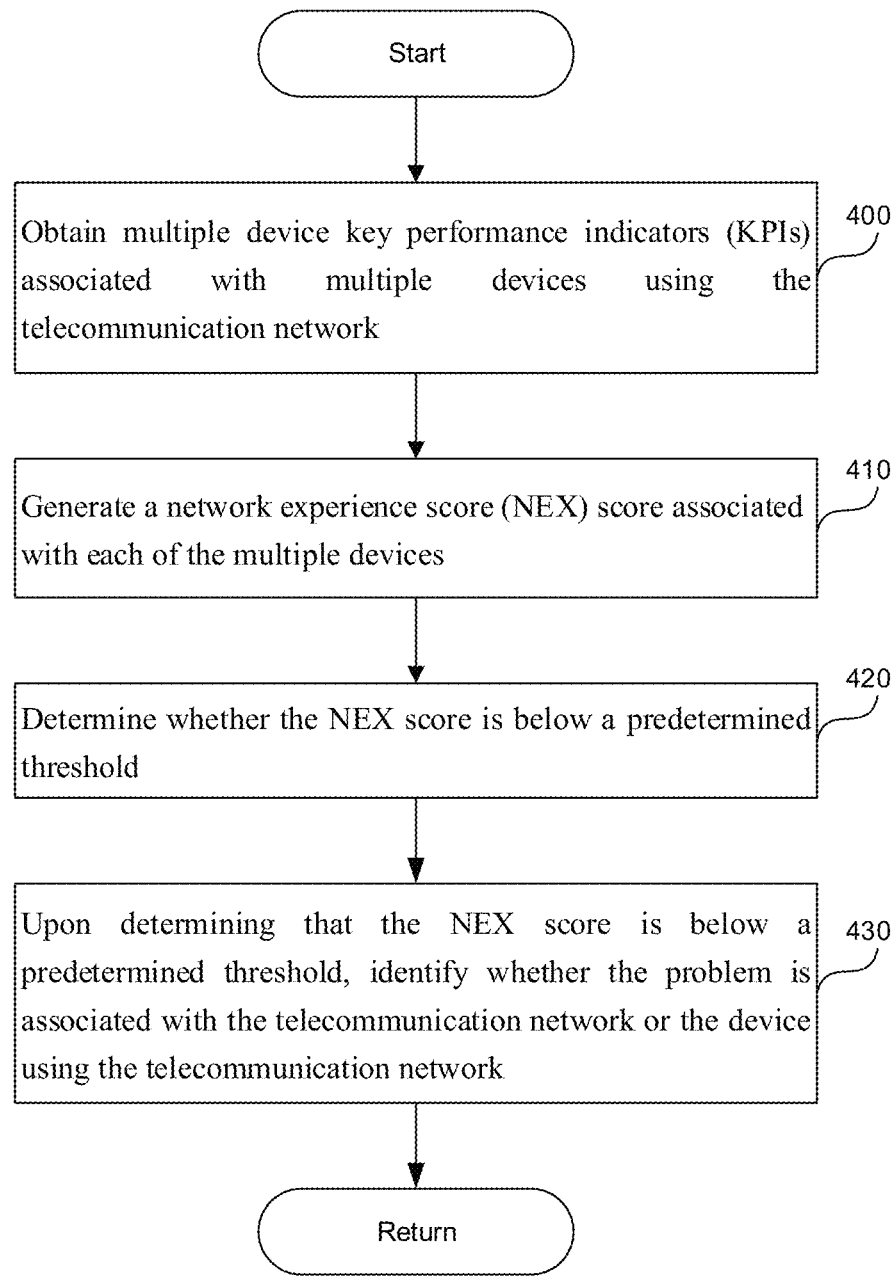
FIG. 4 is a flowchart of a method to identify a problem associated with a telecommunication network or a device using the telecommunication network.

FIG. 4 is a flowchart of a method to identify a problem associated with a telecommunication network or a device using the telecommunication network. In step 400, a processor can obtain multiple device key performance indicators (KPIs) associated with multiple devices using the telecommunication network. The device KPIs indicate a likelihood that a device among the multiple devices disassociates from the telecommunication network, and can include voice usage, billing account number (BAN) count, payload usage, and/or tenure.

In step 410, the processor can generate a network experience score (NEX) score associated with each of the multiple devices using the telecommunication network. To generate the NEX score, the processor can segment the multiple devices into multiple groups having similar device KPIs. The processor can obtain multiple machine learning models, where one machine learning model corresponds to one group among the multiple groups. The processor can determine the NEX for each device in each group by providing network KPIs to the machine learning model. The network KPIs indicate technical performance of the telecommunication network, and can include a voice dropped call count, a voice dropped call rate, a low coverage value, a data leakage value, an average air interface throughput value, such as Long-Term Evolution (LTE) throughput value, and/or a number of minutes between radio access technology (RAT) change.

To segment the multiple devices into multiple groups, for each device KPI, the processor can determine a first value range indicative of a device more likely to disassociate from the telecommunication network and a second value range indicative of a device less likely to disassociate from the telecommunication network. For example, for BAN, the first value range indicative of the device more likely to disassociate from the telecommunication network can include 1-2, while the second value range indicative of the device less likely to disassociate from the telecommunication network can include a number greater than 2. The processor can segment the device more likely to disassociate from the telecommunication network into a first group, and the device less likely to disassociate from the telecommunication network into a second group, as explained in FIG. 2.

In step 420, the processor can determine whether the NEX score is below a predetermined threshold, such as below 80% of the maximum score. The predetermined threshold is indicative of a device likely to disassociate from the telecommunication network.

In step 430, the processor, upon determining that the NEX score is below a predetermined threshold, can identify whether the problem is associated with the telecommunication network and/or the device using the telecommunication network. To identify whether the problem is due to the telecommunication network, the processor can obtain network usage information associated with the device having the NEX score below the predetermined threshold. Based on the network usage information, the processor can determine a network element associated with the network KPI indicative of a network problem, wherein the network element comprises a cell tower, a sector of the cell tower, or an antenna within the sector. For example, the processor can identify the tower that dropped the call, an area of the telecommunication networks with low coverage, whether any data leakage occurred, etc. If such a problem can be identified from the network data, the processor can suggest a correction to the network problem. Sometimes, the problem can be due to the device, instead of the telecommunication network.

The processor can determine whether the problem the device is experiencing is with the telecommunication network and/or the problem is with the device. To determine whether the problem is a network problem, the processor can gather information from network monitoring software and/or cell towers, trace device calls from tower to tower and determine which tower caused, for example, the call to drop. To determine whether the problem is the user device problem, the processor can determine technological capability of the device from the device TAC number.

The processor can obtain device information associated with a device having the NEX score below the predetermined threshold and network usage information associated with the device having the NEX score below the predetermined threshold. The TAC device information can include the TAC number of the device. For example, a TAC number of 35325807 indicates that the make is Apple and that the model is iPhone 6s. Based on the device information, the processor can determine technological capabilities of the device. For example, the iPhone 6s is capable of 4G communication. The processor can determine whether the technological capabilities of the device are reflected in the network usage information by comparing the technological capabilities of the device to the network usage information. For example, the processor can determine whether the network usage information of the iPhone 6s device includes 4G communication. Upon determining that the technological capabilities of the device are not reflected in the network usage information, the processor can provide information to the device suggesting a change of settings to the device. For example, the iPhone 6 as can have 4G disabled in its settings because the user has returned from a foreign country where 4G service is not available.

In another example, the TAC number of the device can be 01161200, indicating that the make is Apple and that the model is iPhone 3G, which is not capable of 4G communication. In that case, the network usage information indicates that the iPhone 3G does not connect to the 4G network, which correctly reflects the technological capabilities of the iPhone 3G. However, the 3G network is a legacy network, and newer and faster devices offer higher bandwidth. Upon determining that the technological capabilities of the device are reflected in the network usage information, but that the NEX score of the device is low at least in part due to the issues of the device, the processor suggests an upgrade to the device, such as a discount on a cell phone capable of a 4G air interface.

The telecommunication network has many elements, such as towers, sectors, and antennas, servers, routers, etc. Multiple network elements can have technical issues, and the processor needs to prioritize the multiple technical issues. To determine which of the technical issues in which of the network elements to resolve first, the processor can obtain network information from a network monitoring module, where the network information includes multiple network KPIs associated with multiple elements in the telecommunication network. The network KPIs can include a voice dropped call count, a voice dropped call rate, a low coverage value, a data leakage value, an average air interface throughput value, or number of minutes between radio access technology (RAT) change.

The processor can identify a first network element among multiple network elements by correlating the multiple network KPIs with the NEX score associated with each of the multiple devices. Through the correlation, the processor can determine the network elements that a device with the low NEX score utilized. Further, the processor can determine among the utilized network elements, the first network element that has network KPIs tending to cause low NEX scores, as described in this application. The first network element can have more network KPIs tending to cause low NEX scores than other network elements, e.g., a second network element. The processor can initially examine the first network element for technical problems.

The telecommunication network can have network elements that have more technical problems than the first network element. However, the other network elements may not be causing low NEX scores because their technical failures are spread among the multiple users, while the first network element's failure tend to aggravate a single, or a small number of users, thus causing the low NEX score.

The processor can determine multiple network elements associated with the telecommunication network and involved in causing multiple low NEX scores associated with the multiple devices. To make the determination, the processor can trace calls of each device having a low NEX score to find the network element that was involved in causing a dropped call, low coverage, data leakage, long hand-off time, voice muting, voice garbling, voice soft drops, etc.

For each network element among the multiple network elements, the processor can determine how frequently the network element is involved in causing a low NEX score among the multiple next scores. The processor can rank a network element among the multiple network elements according to how frequently the network element is associated with causing the low NEX score. Consequently, the network elements at the top of the list can be fixed first.

Computer

Figure 5:
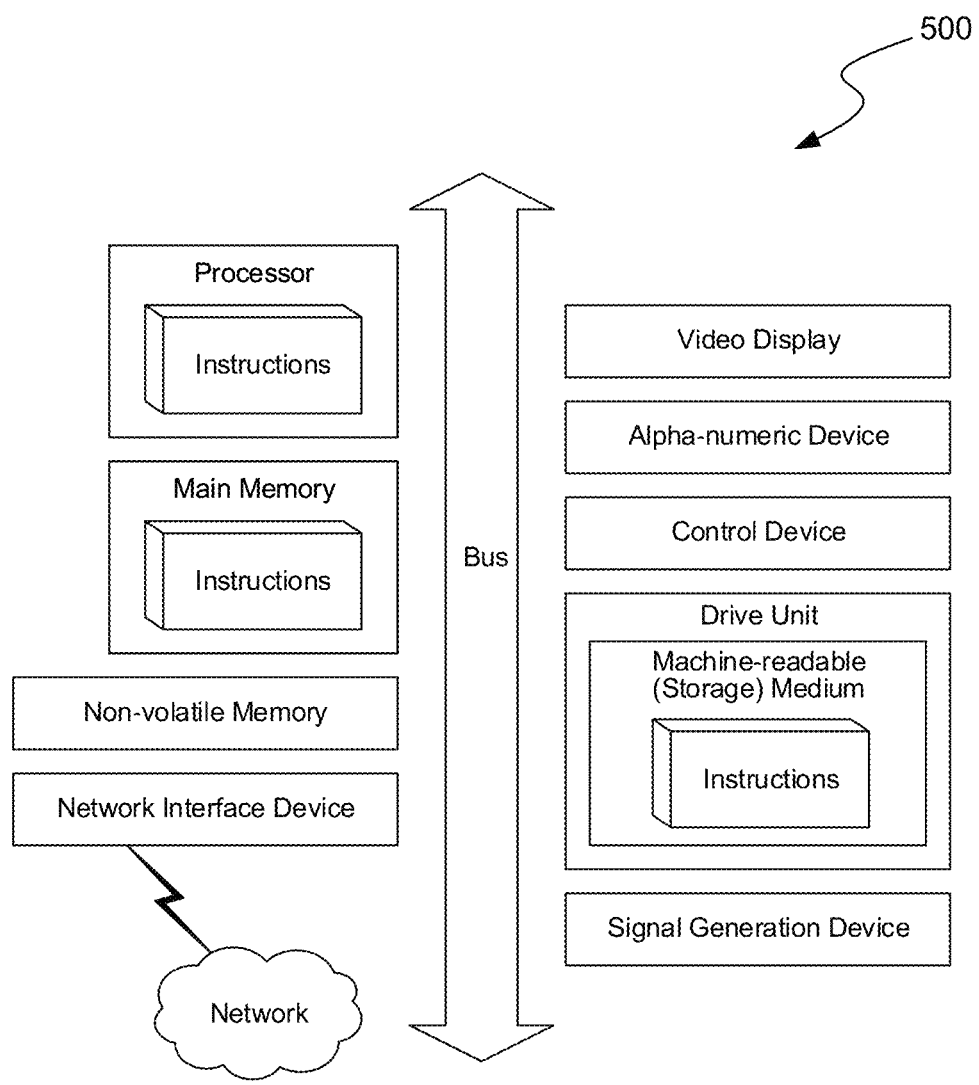
FIG. 5 is a diagrammatic representation of a machine in the example form of a computer system within which a set of instructions, for causing the machine to perform any one or more of the methodologies or modules discussed herein, can be executed.

FIG. 5 is a diagrammatic representation of a machine in the example form of a computer system 500 within which a set of instructions, for causing the machine to perform any one or more of the methodologies or modules discussed herein, can be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

The computer system 500 can be associated with the device 100, 110, 120, 130 in FIG. 1. The computer system 500 can be part of the network monitoring system, gathering network KPIs associated with the towers 140, 150, 160 in FIG. 1. The processor of the computer system 500 can execute the various instruction described in this application. The processor of the computer system 500 can be the processor 200 in FIG. 2, and/or can execute the machine learning models 260, 270, 280 in FIG. 2. The main memory, nonvolatile memory, and/or the drive unit of the computer system 500 can store the instructions to be executed by the processor. The network of the computer system 500 can support the wireless communication between the devices 100, 110, 120, 130 and towers 140, 150, 160.

This disclosure contemplates the computer system 500 taking any suitable physical form. As example and not by way of limitation, computer system 500 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 can include one or more computer systems 500; be unitary or distributed; span multiple locations; span multiple machines; or reside in a cloud, which can include one or more cloud components in one or more networks. Where appropriate, one or more computer systems 500 can perform without substantial spatial or temporal limitation one or more steps of one or more methods described or illustrated herein. As an example and not by way of limitation, one or more computer systems 500 can perform in real time or in batch mode one or more steps of one or more methods described or illustrated herein. One or more computer systems 500 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory can not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

REMARKS

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A method to identify a problem associated with a telecommunication network or a device using the telecommunication network, the method comprising:
   obtaining device key performance indicators (KPIs) associated with each of multiple devices using the telecommunication network,
   wherein the device KPIs comprise at least two of: billing account number (BAN) count, payload usage, voice usage, or tenure,
   wherein the BAN represents a number of lines one of the multiple devices has registered with the telecommunication network and wherein the tenure represents how long the one device has been using the telecommunication network;
   generating a network experience (NEX) score associated with each of the multiple devices using the telecommunication network by:
   segmenting the multiple devices into multiple groups having similar device KPIs;
   obtaining multiple machine learning models, wherein each machine learning model among the multiple machine learning models corresponds to each group among the multiple groups;
   determining the NEX score for each device in each group among the multiple groups by providing network KPIs to the machine learning model,
   wherein the network KPIs comprise at least two of: a voice dropped call count, a voice dropped call rate, a low coverage value, a data leakage value, an average air interface throughput value, or a number of minutes between radio access technology (RAT) change;
   determining whether the NEX score is below a predetermined threshold; and
   upon determining that the NEX score is below the predetermined threshold, identifying whether the problem is associated with the telecommunication network or the device using the telecommunication network by obtaining a Type Allocation Code (TAC) number of the device, wherein the TAC number of the device indicates technological capability of the device.

2. The method of claim 1, wherein the segmenting further comprises:
   for each device KPI determining a first value range indicative of a device more likely to disassociate from the telecommunication network and a second value range indicative of a device less likely to disassociate from the telecommunication network; and
   segmenting the device more likely to disassociate from the telecommunication network into a first group, and the device less likely to disassociate from the telecommunication network into a second group.

3. The method of claim 1, wherein the identifying further comprises:
   obtaining network usage information associated with the device having the NEX score below the predetermined threshold;
   based on the network usage information determining a network element associated with the network KPIs indicative of a network problem, wherein the network element comprises a cell tower, a sector of the cell tower, or an antenna within the sector; and
   suggesting a correction to the network problem.

4. The method of claim 1, wherein the identifying further comprises:
   obtaining device information associated with a first device having the NEX score below the predetermined threshold and network usage information associated with the first device;
   based on the device information determining technological capabilities of the first device;
   determining whether the technological capabilities of the first device are reflected in the network usage information by comparing the technological capabilities of the first device to the network usage information; and
   upon determining that the technological capabilities of the first device are not reflected in the network usage information, providing information to the first device suggesting a change of settings to the first device.

5. The method of claim 1, wherein the identifying further comprises:
   obtaining device information associated with a first device having the NEX score below the predetermined threshold and network usage information associated with the first device;
   based on the device information determining technological capabilities of the first device;
   determining whether the technological capabilities of the first device are reflected in the network usage information by comparing the technological capabilities of the first device to the network usage information; and
   upon determining that the technological capabilities of the first device are reflected in the network usage information, suggesting an upgrade to the first device.

6. The method of claim 1, further comprising:
   obtaining network information from a network monitoring module, the network information including multiple network KPIs associated with multiple elements in the telecommunication network; and
   identifying a first network element among multiple network elements to fix by correlating the multiple network KPIs with the NEX score associated with each of the multiple devices and isolating the first network element correlated to a higher number of low NEX scores than a second network element among the multiple network elements.

7. The method of claim 1, wherein the predetermined threshold is indicative of a device likely to disassociate from the telecommunication network.

8. A system comprising:
   one or more processors;

memory coupled to the one or more processors, wherein the memory includes instructions executable by the one or more processors to:

obtain device key performance indicators (KPIs) associated with multiple devices using a telecommunication network,
  wherein the device KPIs indicate a likelihood that a device among the multiple devices disassociates from the telecommunication network;

generate a network experience (NEX) score associated with each of the multiple devices using the telecommunication network by:
  segmenting the multiple devices into multiple groups having similar device KPIs;
  obtaining multiple machine learning models, wherein each machine learning model among the multiple machine learning models corresponds to each group among the multiple groups;
  determining the NEX score for each device in each group among the multiple groups by providing network KPIs to the machine learning model,
    wherein the network KPIs indicate technical performance of the telecommunication network;
  determining whether the NEX score is below a predetermined threshold; and
  upon determining that the NEX score is below the predetermined threshold, identify whether the NEX score below the predetermined threshold is caused by the telecommunication network, or the device using the telecommunication network, or both the telecommunication network and the device using the telecommunication network by obtaining a Type Allocation Code (TAC) number of the device, wherein the TAC number of the device indicates technological capability of the device.

9. The system of claim 8, further comprising wherein the device KPIs comprise at least two of: voice usage, billing account number (BAN) count, payload usage, and tenure.

10. The system of claim 8, wherein the network KPIs comprise at least two of: a voice dropped call count, a voice dropped call rate, a low coverage value, a data leakage value, an average Long-Term Evolution (LTE) throughput value, and a number of minutes between radio access technology (RAT) change.

11. The system of claim 8, wherein the instructions to segment further comprise instructions to:
  for each device KPI determine a first value range indicative of a device more likely to disassociate from the telecommunication network and a second value range indicative of a device less likely to disassociate from the telecommunication network; and
  segmenting the device more likely to disassociate from the telecommunication network into a first group, and the device less likely to disassociate from the telecommunication network into a second group.

12. The system of claim 8, wherein the instructions to identify further comprise instructions to:
  obtain network usage information associated with the device having the NEX score below the predetermined threshold;
  based on the network usage information determine a network element associated with the network KPIs indicative of a network problem, wherein the network element comprises a cell tower, a sector of the cell tower, or an antenna within the sector; and
  suggest a correction to the network problem.

13. The system of claim 8, wherein the instructions to identify further comprise instructions to:
  obtain device information associated with a first device having the NEX score below the predetermined threshold and network usage information associated with the first device;
  based on the device information determine technological capabilities of the first device;
  determine whether the technological capabilities of the first device are reflected in the network usage information by comparing the technological capabilities of the first device to the network usage information; and
  upon determining that the technological capabilities of the first device are not reflected in the network usage information, provide information to the first device suggesting a change of settings to the first device.

14. The system of claim 8, wherein the instructions to identify further comprise instructions to:
  obtain device information associated with a first device having the NEX score below the predetermined threshold and network usage information associated with the first device;
  based on the device information determine technological capabilities of the first device;
  determine whether the technological capabilities of the first device are reflected in the network usage information by comparing the technological capabilities of the first device to the network usage information; and
  upon determining that the technological capabilities of the first device are reflected in the network usage information, suggest an upgrade to the first device.

15. The system of claim 8, further comprising the instructions to:
  obtain network information from a network monitoring module, the network information including multiple network KPIs associated with multiple elements in the telecommunication network; and
  identify a first network element among multiple network elements to fix by correlating the multiple network KPIs with the NEX score associated with each of the multiple devices and isolating the first network element correlated to a higher number of low NEX scores than a second network element among the multiple network elements.

16. At least one non-transient computer-readable medium, carrying instructions that, when executed by at least one data processor, performs a method comprising:
  obtaining device key performance indicators (KPIs) associated with multiple devices using a telecommunication network,
    wherein the device KPIs comprise at least two of: voice usage, billing account number (BAN) count, payload usage, or tenure;
  generating a network experience (NEX) score associated with each of the multiple devices using the telecommunication network by:
    segmenting the multiple devices into multiple groups having similar device KPIs;
    obtaining multiple machine learning models, wherein each machine learning model among the multiple machine learning models corresponds to each group among the multiple groups;
    determining the NEX score for each device in each group among the multiple groups by providing network KPIs to the machine learning model,
      wherein the network KPIs comprise at least two of: a voice dropped call count, a voice dropped call rate, a low coverage value, a data leakage value, an average air interface throughput value, or number of minutes between radio access technology (RAT) change;

determining whether the NEX score is below a predetermined threshold; and upon determining that the NEX score is below the predetermined threshold, identifying whether the NEX score below the predetermined threshold is caused by the telecommunication network and/or the device using the telecommunication network by obtaining a Type Allocation Code (TAC) number of the device, wherein the TAC number of the device indicates technological capability of the device.

17. The non-transient computer-readable medium of claim 16, wherein the segmenting further comprises:

for each device KPI determining a first value range indicative of a device more likely to disassociate from the telecommunication network and a second value range indicative of a device less likely to disassociate from the telecommunication network; and segmenting the device more likely to disassociate from the telecommunication network into a first group, and the device less likely to disassociate from the telecommunication network into a second group.

18. The non-transient computer-readable medium of claim 16, wherein the identifying further comprises:

obtaining network usage information associated with the device having the NEX score below the predetermined threshold;

based on the network usage information determining a network element associated with the network KPIs indicative of a network problem, wherein the network element comprises a cell tower, a sector of the cell tower, or an antenna within the sector; and suggesting a correction to the network problem.

19. The non-transient computer-readable medium of claim 16, wherein the identifying further comprises:

obtaining device information associated with a first device having the NEX score below the predetermined threshold and network usage information associated with the first device;

based on the device information determining technological capabilities of the first device;

determining whether the technological capabilities of the first device are reflected in the network usage information by comparing the technological capabilities of the first device to the network usage information; and upon determining that the technological capabilities of the first device are not reflected in the network usage information, providing information to the first device suggesting a change of settings to the first device.

20. The non-transient computer-readable medium of claim 16, further comprising:

obtaining network information from a network monitoring module, the network information including multiple network KPIs associated with multiple elements in the telecommunication network; and identifying a first network element among multiple network elements to fix by correlating the multiple network KPIs with the NEX score associated with each of the multiple devices and isolating the first network element correlated to a higher number of low NEX scores than a second network element among the multiple network elements.

21. The non-transient computer-readable medium of claim 16, further comprising:

determining multiple network elements associated with the telecommunication network involved in causing multiple low NEX scores associated with the multiple devices;

for each network element among the multiple network elements determining how frequently the network element is involved in causing a low NEX score among the multiple low NEX scores; and ranking the network element among the multiple network elements according to how frequently the network element is associated with causing the low NEX score.

* * * * *